STEREO ATTACHMENT FOR STANDARD FREQUENCY MODULATION RECEIVER

Filed June 22, 1967 2 Sheets-Sheet 1

INVENTOR.
DARRELL L. GOURLEY
BY Christie, Parker & Hale
ATTORNEYS.

STEREO ATTACHMENT FOR STANDARD FREQUENCY MODULATION RECEIVER

Filed June 22, 1967 2 Sheets-Sheet 2

INVENTOR.
DARRELL L. GOURLEY
BY
Christie, Parker & Hale
ATTORNEYS.

3,526,720

STEREO ATTACHMENT FOR STANDARD FREQUENCY MODULATION RECEIVER

Darrell L. Gourley, 371 Maria St., Santa Clara, Calif. 95050

Filed June 22, 1967, Ser. No. 648,041
Int. Cl. H04k 5/00
U.S. Cl. 179—15 10 Claims

ABSTRACT OF THE DISCLOSURE

An equalizer connected to the audio output of a standard frequency modulation receiver derives a usable stereo multiplex signal. The equalizer has a frequency response that substantially complements the frequency response of the receiver at its audio output throughout the stereo multiplex range. The signal derived by the equalizer is applied to a standard stereo multiplex demodulator that produces two audio signals in stereo relationship to one another. The transfer function of the equalizer consists within the stereo multiplex range of one zero at 2.1 kilohertz plus a combination of one or more poles and/or zeros located between zero and 53 kilohertz. The transfer function of the latter combination can be alternated by changing the setting of variable components to complement the transfer function of any particular receiver.

BACKGROUND OF THE INVENTION

This invention relates to frequency modulaiton stereo multiplex reception and, more particularly, to an attachment for producing stereo from the audio output of a standard frequency modulation receiver.

Frequency modulation has been employed for many years in commercial radio broadcasting. Until recently, FM stations have transmitted their programs exclusively in monophonic sound. Since the introduction of stereo sound equipment to the public, many FM radio stations have begun to transmit their programs in stereo sound through utilization of multiplexing techniques.

Currently, FM receivers are available on the market that are capable of accommodating stereo multiplex signals and producing therefrom two audio signals in stereo relationship to one another. Even before FM stereo multiplex programming began on a permanent basis, standard receivers, i.e., receivers that produce a monophonic output, were manufactured with a special output jack to which a multiplex demodulator-adapter could be attached. The special multiplex output jack is coupled to the output of the discriminator or demodulator inside of the receiver at a point in the signal path prior to the deemphasis network. The stereo multiplex signal appearing at the output of the discriminator comprises the following component parts: a side band between zero and 15 kilohertz, which represents the sum of the left and right audio channels; a pilot at 19 kilohertz; and side bands between 23 kilohertz and 53 kilohertz centered about a suppressed carrier at 38 kilohertz, which represent the difference between the left and right channels. The pilot is employed to regenerate a subcarrier at 38 kilohertz for synchronous detection of the difference side bands. Thereafter the difference and sum side bands are matrixed to derive the right and left channel audio signals. In the design of the circuits for processing the stereo multiplex signal, great care is taken to preserve the proper phase relationships between the sum side band, the difference side bands, and the pilot. These phase relationships are somewhat critical in both the synchronous detection and matrixing operations. Thus, if the phase relationship of the 19-kilohertz pilot is changed, the stereo effect is diminished unless the phase is corrected in the multiplex demodulator.

Many FM receivers manufactured before the advent of FM stereo multiplex broadcasting, as well as low-priced portable FM receivers currently being manufactured, have no output jack to which a multiplex adapter can be connected. Theoretically, it is possible to gain access to the interior of these receivers and establish a connection for a stereo multiplex adapter at the proper point. Practically, however, this is rarely done for various reasons. For one thing, the expense involved in having the work done professionally would only be justified in the case of a high-priced receiver. Further, the job is usually too complex for an amature to undertake himself.

SUMMARY OF THE INVENTION

The invention involves an attachment that produces two audio signals in stereo relationship to one another from the audio output of a standard frequency modulation receiver. Thus, the attachment could be connected to speaker terminals or an earphone jack of the receiver. The attachment comprises an equalizer that has a frequency response complementing the frequency response of the audio output of an FM receiver throughout the stereo multiplex range and a standard stereo multiplex demodulator. The component parts of the stereo multiplex signal produced by the equalizer, particularly the 19-kilohertz pilot, can be adjusted to provide the phase relationship necessary to produce the stereo effect. The equalizer has a transfer function consisting within the stereo multiplex range of a single zero plus a combination of poles and/or zeros. The transfer function of the combination is preferably adjustable to accommodate receivers with different frequency characteristics at the audio output.

BRIEF DESCRIPTION OF THE DRAWINGS

The features of a specific embodiment of the invention are illustrated in the drawings, in which.

DESCRIPTION OF A SPECIFIC EMBODIMENT

Figure 1:
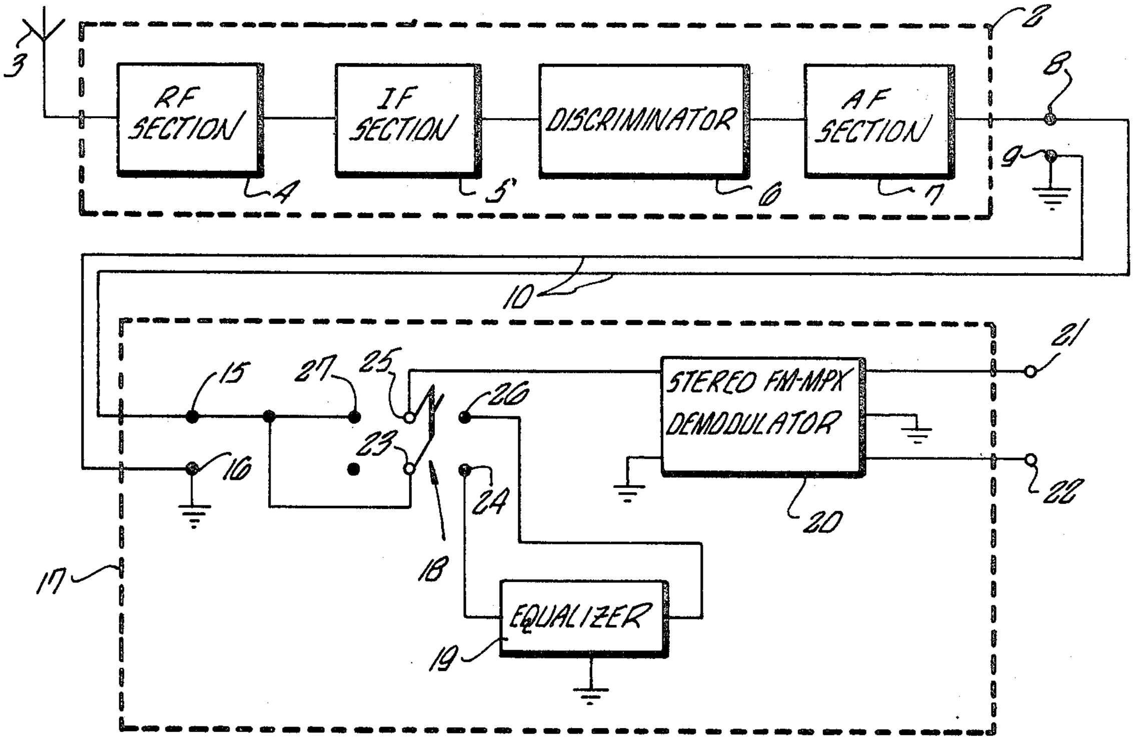
FIG. 1 is a circuit schematic diagram in block form of a standard frequency modulation receiver and a stereo attachment utilizing the principles of the invention.

In FIG. 1, a standard frequency modulation receiver is shown in block form inside of a box 2. Frequency modulated radio signals are intercepted by an antenna 3 and coupled to a radio frequency section 4. In radio frequency section 4, the frequency modulated signal is amplified and translated to an intermediate frequency. Radio frequency section 4 is connected to an intermediate frequency section 5 in which the signal is amplified preparatory to application to a frequency discriminator or demodulator 6. At the output of discriminator 6 a signal is developed, the amplitude of which varies in proportion to the frequency modulation of the intermediate frequency signal applied to discriminator 6. If the receiver is tuned to a station transmitting a monophonic program, then the output of discriminator 6 is a simple monophonic audio signal. If the receiver is tuned to a station transmitting a stereo program, the output of discriminator 6 is a stereo multiplex signal occupying a range from zero to 53 kilohertz and consisting of the usual component parts. The output of discriminator 6 is connected to an audio frequency amplifier 7 that increases the strength of the audio signal sufficiently to drive a speaker. (Audio output terminals 8 and 9 could be an earphone jack or speaker terminals situated on the texterior of the receiver.) Irrespective of whether the receiver is tuned to a station transmitting a stereo program or a monophonic program, an audio signal is produced across audio output terminals 8 and 9. The frequencies of this audio signal above 2.1 kilohertz are substantially attenuated.

The accepted way to derive two audio signals in stereo relationship from such a standard frequency modulation receiver is to attach a multiplex adapter to the output of discriminator 6. The stereo multiplex signal appearing at the output of discriminator 6 is then processed in the multiplex adapter by circuits that are well known in the art, and two audio signals in stereo relationship are developed.

The invention involves a stereo attachment in box 17 having an equalizer 19 and a stereo frequency modulation multiplex demodulator 20. The attachment is suitable for connection to the audio output of a standard FM receiver. Equalizer 19 has a frequency response that approximately complements the frequency response of receiver 2 within the stereo multiplex region. Consequently, the combined frequency response of receiver 2 and equalizer 19 is nearly flat. Accordingly, the signal at the output of equalizer 19 is in a form in which multiplex demodulator 20 can separate the two stereo channels and place them in stereo relationship. Audio output terminals 8 and 9 of the receiver are connected by leads 10, which could be a coaxial cable, to input terminals 15 and 16 of the stereo attachment. The attachment comprises a double-pole, double-throw switch 18, equalizer 19, and standard stereo frequency modulation multiplex demodulator 20. Demodulator 20 is a commercially available piece of equipment. It processes a stereo multiplex signal, developing therefrom two audio signals in stereo relationship. After amplification, these two audio signals appear between an output terminal 21 and ground and an output terminal 22 and ground, respectively. A set of stereo earphones or a pair of speakers would then be employed to produce stereophonic sound from these two audio signals. Switch 18 could be, for example, a slide switch. When the stereo attachment is connected to the audio output of the frequency modulation receiver, as shown in FIG. 1, switch 18 in one position connects terminals 23 and 24 together and terminals 25 and 26 together. As a result, input terminals 15 and 16 are indirectly coupled to demodulator 20 through equalizer 19. As described in detail below, equalizer 19 derives a usable stereo multiplex signal from which demodulator 20 produces two audio signals in stereo relationship. Switch 18 permits the use of the stereo attachment with a receiver having a multiplex output jack as well. In such case, equalizer 19 is not needed. Switch 18 in the other position connects terminals 27 and 25 together so input terminals 15 and 16 are directly coupled to demodulator 20 by a signal path that bypasses equalizer 19.

Reference is now made to FIGS. 2A through 2E for various embodiments of equalizer 19. One or more passive networks, including a combination of resistors, capacitors, and/or inductors, are involved. The passive networks have transfer functions that shape the frequency response of equalizer 19 so as to complement nearly the frequency response of receiver 2. In some of the embodiments, amplifiers are also employed to restore the signal level lost in the passive networks. Regardless of the configuration employed in a particular application of the invention, a minimum degree of phase linearity between the 19-kilohertz pilot and the 38-kilohertz suppressed carrier must be maintained. However, minor adjustments in this phase relationship can be accomplished in multiplex demodulator 20.

Figure 2A:
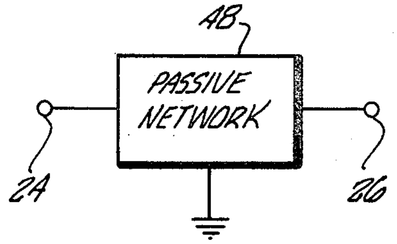
FIGS. 2A through 2E are schematic diagrams in block form of various embodiments of the equalizer shown in FIG. 1.
Figure 2B:
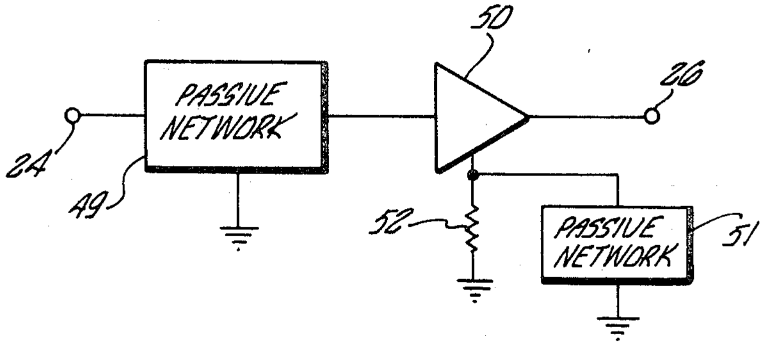
Figure 2C:
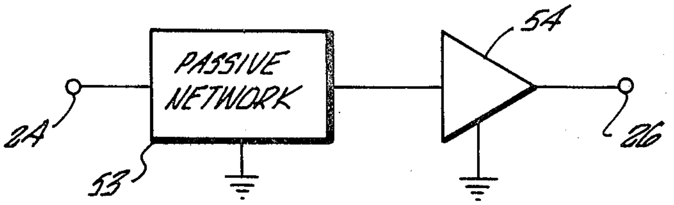
Figure 2D:
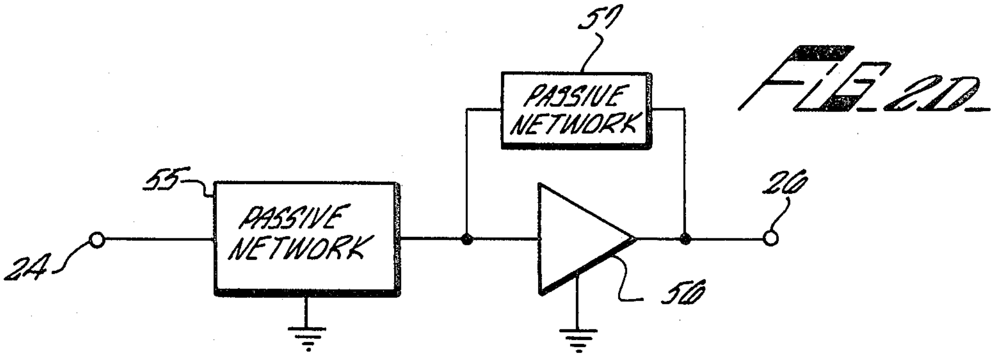
Figure 2E:
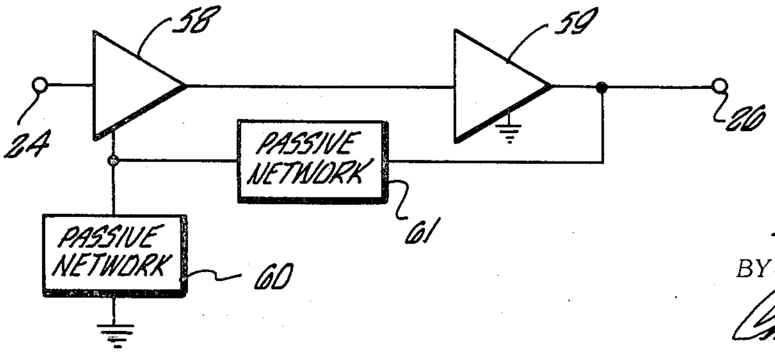

Specifically, the embodiment of FIG. 2A comprises a passive network 48 directly connected in series between terminals 24 and 26 of switch 18 (FIG. 1). FIG. 2B comprises a passive network 49 and an amplifier 50 connected in series between terminals 24 and 26. A passive network 51 and a resistor 52 are connected in parallel between the common terminal of amplifier 50 and ground. FIG. 2C comprises a passive network 53 and an amplifier 54 connected in series between terminals 24 and 26. This can be considered as the special case of the embodiment of FIG. 2B, in which passive network 51 has zero impedance throughout the stereo multiplex range. FIG. 2D comprises a passive network 55 and an operational amplifier 56 connected in series between terminals 24 and 26. Operational amplifier 56 has a passive network 57 in its feedback path. As a special case of this embodiment, passive network 55 could have zero impedance throughout the stereo multiplex range. FIG. 2E comprises amplifiers 58 and 59 connected in series between terminals 24 and 26 and passive networks 60 and 61. Passive network 60 is connected between the common terminal of amplifier 58 and ground, and passive network 61 is connected in a feedback path from the output of amplifier 59 to the common terminal of amplifier 58.

In each of the embodiments of FIGS. 2A through 2E, the passive networks are designed so that the poles and zeros of the transfer function of the equalizer are so positioned that the frequency response of the equalizer approximately complements the frequency response of receiver 2. The exact design of the various passive networks and the equalizer embodiment selected therefore depend upon the particular characteristics of the receiver to be used with the stereo attachment and the degree of perfection desired in making the frequency response of the equalizer complement the frequency response of receiver 2.

Figure 4:
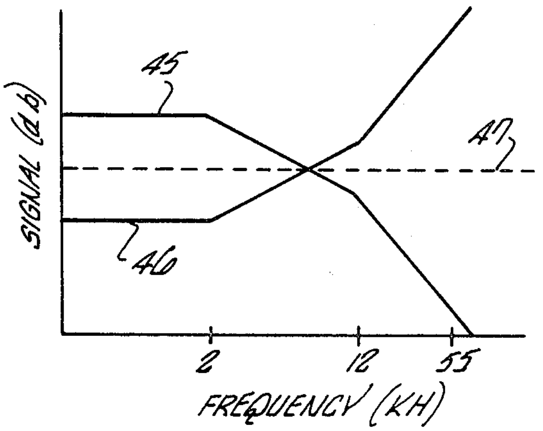
FIG. 4 is a graph of signal intensity as a function of frequency which illustrates the characteristics of a typical frequency modulation receiver and the characteristics of the equalizer circuit shown in FIG. 3.

The equalizer of FIG. 2B is shown in detail in FIG. 4. It functions basically as a voltage divider. Passive network 49 has a resistor 30 and a capacitor 31 in parallel, and passive network 51 has a capacitor 40 and a variable resistor 41 in series. In appropriate cases the passive networks could be resonant circuits instead of a simple resistance-capacitance or resistance-inductance circuit. A resistor 33 is connected between terminal 24 and ground, and a coupling capacitor 34 connects terminal 24 to the series branch of the voltage divider. The value of capacitor 34 is sufficiently large to couple signals within the stereo multiplex range to the series branch of the voltage divider without appreciable attenuation. To serve as amplifier 50, a transistor 32 connected in the common emitter configuration is provided. Bias is supplied by a source of positive potential 35 connected to the base of transistor 32 by a resistor 36 and to the emitter of transistor 32 by by resistor 52. A load resistor 38 is connected between the collector of transistor 32 and ground. Terminal 26 is directly connected to the collector of transistor 32. A resistor 39 is coupled between the base of transistor 32 and ground.

Typically, the frequency response at output terminals 8 and 9 of the receiver is flat from near zero to about 2.1 kilohertz, drops off from there at one slope to about 12 kilohertz, and then drops off at a steeper slope to the end of the stereo multiplex range at 55 kilohertz. The drop at 2.1 kilohertz can be attributed to the deemphasis network in the receiver, and the drop at 12 kilohertz can be attributed to the transformers in audio frequency amplifier 7. In FIG. 4, which is a graph of signal amplitude in decibels as a function of frequency on a logarithmic scale, curve 45 is a rough representation of frequency response across output terminals 8 and 9 of a typical FM receiver. Curve 45 is only a typical receiver frequency response. In practice, the precise nature of the frequency response would vary from receiver to receiver. Some receivers, for example, might have resonant peaks or one or more additional slopes within the stereo multiplex range. The frequency response of the equalizer of FIG. 3, which is represented roughly by curve 46 in FIG. 4, approximately complements that of the audio output of the receiver within the stereo multiplex range. In fact, such a frequency response is a convenient approximation of the complement to the frequency response of the transfer function of many different FM receivers. Consequently, the composite frequency response of the receiver and equalizer 19 is substantially flat over the entire stereo multiplex range as indicated by dashed line 47. A usable stereo multiplex signal is thereby derived from the audio signal produced by a standard frequency modulation receiver.

Figure 3:
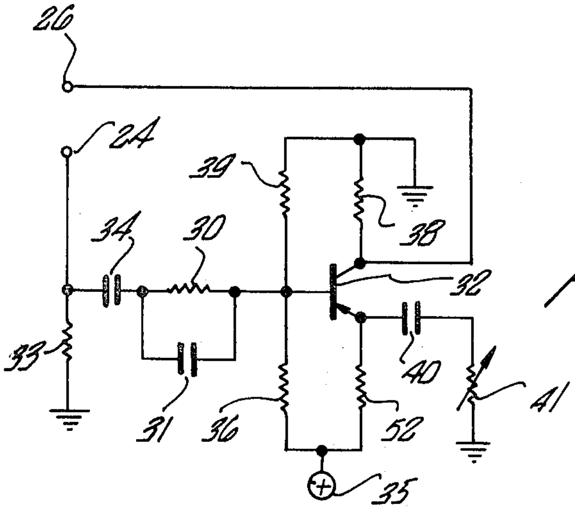
FIG. 3 is a schematic diagram of a particular circuit configuration showing the embodiment of 2B in more detail.

The transfer function of the equalizer in FIG. 3, that is the ratio of the output voltage to the input voltage as a function of frequency, consists within the stereo multiplex range exclusively of two spaced-apart single zeros. One zero is at 2.1 kilohertz and the other predominantly at 12 kilohertz. The transfer function of several typical standard FM receivers between the discriminator and the audio output consists basically of two spaced-apart single poles which coincide with the zeros of the transfer function of equalizer 19. For this reason the critical phase relationship of the stereo multiplex signal is preserved without adjustment in the multiplex demodulator.

The equalizer of FIG. 3 functions substantially as follows to produce the desired frequency response: Below 2.1 kilohertz, the voltage divider is completely resistive, resulting in a flat frequency response. In network 49, resistors 30, 36, and 39 are influential, and in network 51, capacitor 40 is influential in determining the division of voltage. At about 2.1 kilohertz, capacitor 31 starts to reduce the impedance of network 49, with the result that more voltage appears between the base of transistor 32 and ground. At about 12 kilohertz, capacitor 40 becomes effective and causes a reduction in the emitter impedance of transistor 32. This causes more amplification in transistor 32 and therefore more collector voltage. By adjusting variable resistor 41, the point at which the steeper slope begins can be shifted to one side or the other of 12 kilohertz to match the characteristics of the audio frequency amplifier of the particular receiver with which the attachment is used.

What is claimed is:

1. A frequency modulation stereo multiplex system comprising:

- a frequency modulation receiver having an audio output at which an audio signal of suitable signal strength to drive a speaker or earphone is produced upon the reception of a frequency modulation signal by the receiver, the frequency response of the receiver at the audio output being substantially flat within at least part of the audio range and dropping off outside of the audio range;
- an equalizer connected to the audio output of the frequency modulation receiver to derive a usable stereo multiplex signal from the audio signal upon the reception of a frequency modulation stereo multiplex signal by the receiver, the equalizer having a frequency response that approximately complements the frequency response of the receiver at the audio output throughout the stereo multiplex range to produce an approximately flat frequency response; and
- means for developing two audio signals in stereo relationship to one another from the derived multiplex signal.

2. The system of claim 1, in which the equalizer is a passive network with a frequency response that approximately complements the frequency response of the receiver.

3. The system of claim 1, in which the equalizer comprises a first passive network and an amplifier connected in series in the order recited and a second passive network connected in shunt across the common terminal of the amplifier, the transfer functions of the first and second passive networks being such that the frequency response of the equalizer approximately complements the frequency response of the receiver.

4. The system of claim 3, in which the second passive network has substantially zero impedance throughout the stereo multiplex range.

5. The system of claim 3, in which: the stereo multiplex range is divided into first, second, and third adjacent regions in order of increasing frequency; the first passive network has an impedance that remains substantially constant in the first region and decreases in the second and third regions; and the second passive network has an impedance that remains substantially constant in the first and second regions and changes in the third region so as to increase the voltage coupled to the developing means in the third region.

6. The system of claim 1, in which the equalizer comprises the series combination of a first passive network and an operational amplifier having a second passive network in its feedback path, the first and second passive networks having transfer functions such that the equalizer has a frequency response that approximately complements the frequency response of the receiver.

7. The system of claim 6, in which the first passive network has substantially zero impedance throughout the stereo multiplex range.

8. The system of claim 1, in which the equalizer comprises: a first amplifier and a second amplifier connected in series; a first passive network connected in shunt across the common terminal of the first amplifier; and a second passive network connected in series between the output of the second amplifier and the common terminal of the first amplifier, the transfer functions of the first and second passive networks being such that the frequency response of the equalizer approximately complements the frequency response of the receiver.

9. The system of claim, in which the frequency response of the equalizer is adjustable.

10. A stereo attachment for a standard frequency modulation receiver comprising: an equalizer having a frequency response that approximately complements the frequency response of a frequency modulation receiver at its audio output throughout the stereo multiplex range; a frequency modulation stereo multiplex demodulator for producing two audio signals in stereo relationship to one another from a stereo multiplex signal; and means for coupling the output of the equalizer to the input of the demodulator.

References Cited

UNITED STATES PATENTS 3,124,653 3/1964 Schroeder ---------- 179—15

OTHER REFERENCES

Von Recklinghausen, D. R.: Stereophonic F.M. Multiplex System, Electronics World, July 1961, pp. 51–53, 92.

KATHLEEN H. CLAFFY, Primary Examiner

J. B. LEAHEY, Assistant Examiner